US006564302B1

United States Patent
Yagi et al.

(10) Patent No.: US 6,564,302 B1
(45) Date of Patent: May 13, 2003

(54) INFORMATION PROCESSING APPARATUS WITH CACHE COHERENCY

(75) Inventors: Nobuo Yagi, Hadano (JP); Dzikowski Jens Uwe, Fishkill, NY (US); Hiroshi Kakita, Isehara (JP)

(73) Assignee: Hitachi, Ltd., Tokyo (JP)

( * ) Notice: Subject to any disclaimer, the term of this patent is extended or adjusted under 35 U.S.C. 154(b) by 202 days.

(21) Appl. No.: 09/828,983

(22) Filed: Apr. 10, 2001

(30) Foreign Application Priority Data

Apr. 11, 2000 (JP) ........................ 2000-109707

(51) Int. Cl.$^7$ ................. G06F 12/00; G06F 13/00
(52) U.S. Cl. ............... 711/144; 711/122; 711/145; 711/146; 711/141
(58) Field of Search ........................ 711/122, 124, 711/144, 145, 146, 141

(56) References Cited

U.S. PATENT DOCUMENTS

| 5,623,632 | A | * | 4/1997 | Liu et al. | 711/144 |
|---|---|---|---|---|---|
| 5,752,264 | A | * | 5/1998 | Blake et al. | 711/144 |
| 6,052,760 | A | * | 4/2000 | Bauman et al. | 711/119 |
| 6,330,591 | B1 | * | 12/2001 | Ducaroir et al. | 709/213 |
| 6,356,983 | B1 | * | 3/2002 | Parks | 711/145 |
| 6,463,507 | B1 | * | 10/2002 | Arimilli et al. | 711/122 |
| 2002/0129211 | A1 | * | 9/2002 | Arimilli et al. | 711/146 |
| 2002/0144063 | A1 | * | 10/2002 | Peir et al. | 711/141 |

* cited by examiner

Primary Examiner—Hong Kim
(74) Attorney, Agent, or Firm—Antonelli, Terry, Stout & Kraus, LLP

(57) ABSTRACT

An information processing apparatus includes a data ownership table which is a list of processor numbers having data on each of lines in a level 2 cache. When data at an address pointed by a store instruction exists in the level 2 cache, the apparatus references the table to selectively issue an invalidation request only to a processor in which data at the address exists, but does not issue the request to a processor in which the data does not exist. The path busy ratio can be reduced and the data coherency among processors and a system controller can be maintained with a small amount of logics. When a system controller is divided into a plurality of interleaves operating independently of one another and respectively issuing an invalidation request, the requests issued from the interleaves are put into a queue, and requests having different destination processor numbers are simultaneously issued.

22 Claims, 15 Drawing Sheets

FIG. 6

| REQUEST ORIGINATOR | | MEMORY REQUEST | LEVEL 2 CACHE | CLUSTER a | | | | | | | | CLUSTER b~n | | | | | | | |
|---|---|---|---|---|---|---|---|---|---|---|---|---|---|---|---|---|---|---|---|
| | | | | BLOCK 1 | | BLOCK 2 | | | | | | BLOCK 1 | | BLOCK 2 | | | |
| | | | | DATA UNIT 1 | DATA UNIT 2 | DATA UNIT 1 | DATA UNIT 2 | DATA UNIT 3 | DATA UNIT 4 | | | DATA UNIT 1 | DATA UNIT 2 | DATA UNIT 1 | DATA UNIT 2 | DATA UNIT 3 | DATA UNIT 4 |
| PROCESSORS OF CLUSTER A | | FETCH | MISS | SET | SET | SET | SET | SET | SET | | | SET | SET | SET | SET | SET | SET |
| | | | HIT | SET | SET | NO CHANGE | NO CHANGE | NO CHANGE | NO CHANGE | | | NO CHANGE | NO CHANGE | NO CHANGE | NO CHANGE | NO CHANGE | NO CHANGE |
| | | STORE | MISS | SET | SET | SET | SET | SET | SET | | | CLEAR | SET | SET | SET | SET | SET |
| | | | HIT | NO CHANGE | NO CHANGE | NO CHANGE | NO CHANGE | NO CHANGE | NO CHANGE | | | CLEAR | NO CHANGE | NO CHANGE | NO CHANGE | NO CHANGE | NO CHANGE |
| | | FETCH & SET LOCK | MISS | SET | SET | SET | SET | SET | SET | | | CLEAR | SET | SET | SET | SET | SET |
| | | | HIT | SET | SET | NO CHANGE | NO CHANGE | NO CHANGE | NO CHANGE | | | CLEAR | NO CHANGE | NO CHANGE | NO CHANGE | NO CHANGE | NO CHANGE |
| | | STORE & RELEASE LOCK | MISS | SET | SET | SET | SET | SET | SET | | | CLEAR | SET | SET | SET | SET | SET |
| | | | HIT | NO CHANGE | NO CHANGE | NO CHANGE | NO CHANGE | NO CHANGE | NO CHANGE | | | CLEAR | NO CHANGE | NO CHANGE | NO CHANGE | NO CHANGE | NO CHANGE |
| NO PROCESSOR | | FETCH | | NO CHANGE | NO CHANGE | NO CHANGE | NO CHANGE | NO CHANGE | NO CHANGE | | | NO CHANGE | NO CHANGE | NO CHANGE | NO CHANGE | NO CHANGE | NO CHANGE |
| | | STORE | MISS | NO CHANGE | NO CHANGE | NO CHANGE | NO CHANGE | NO CHANGE | NO CHANGE | | | CLEAR | NO CHANGE | NO CHANGE | NO CHANGE | NO CHANGE | NO CHANGE |
| | | PARTIAL STORE | MISS | CLEAR | SET | SET | SET | SET | SET | | | CLEAR | SET | SET | SET | SET | SET |
| | | PARTIAL STORE/STORE | HIT | CLEAR | NO CHANGE | NO CHANGE | NO CHANGE | NO CHANGE | NO CHANGE | | | CLEAR | NO CHANGE | NO CHANGE | NO CHANGE | NO CHANGE | NO CHANGE |

NOTE THAT A LINE IS 512 BYTES, A BLOCK IS 256 BYTES, AND A DATA UNIT IS 128 BYTES. ASSUME THAT A PROCESSOR IN THE CLUSTER ISSUES AN INSTRUCTION, AND AN ADDRESS POINTED BY THE INSTRUCTION IS INCLUDED IN THE DATA UNIT 1.

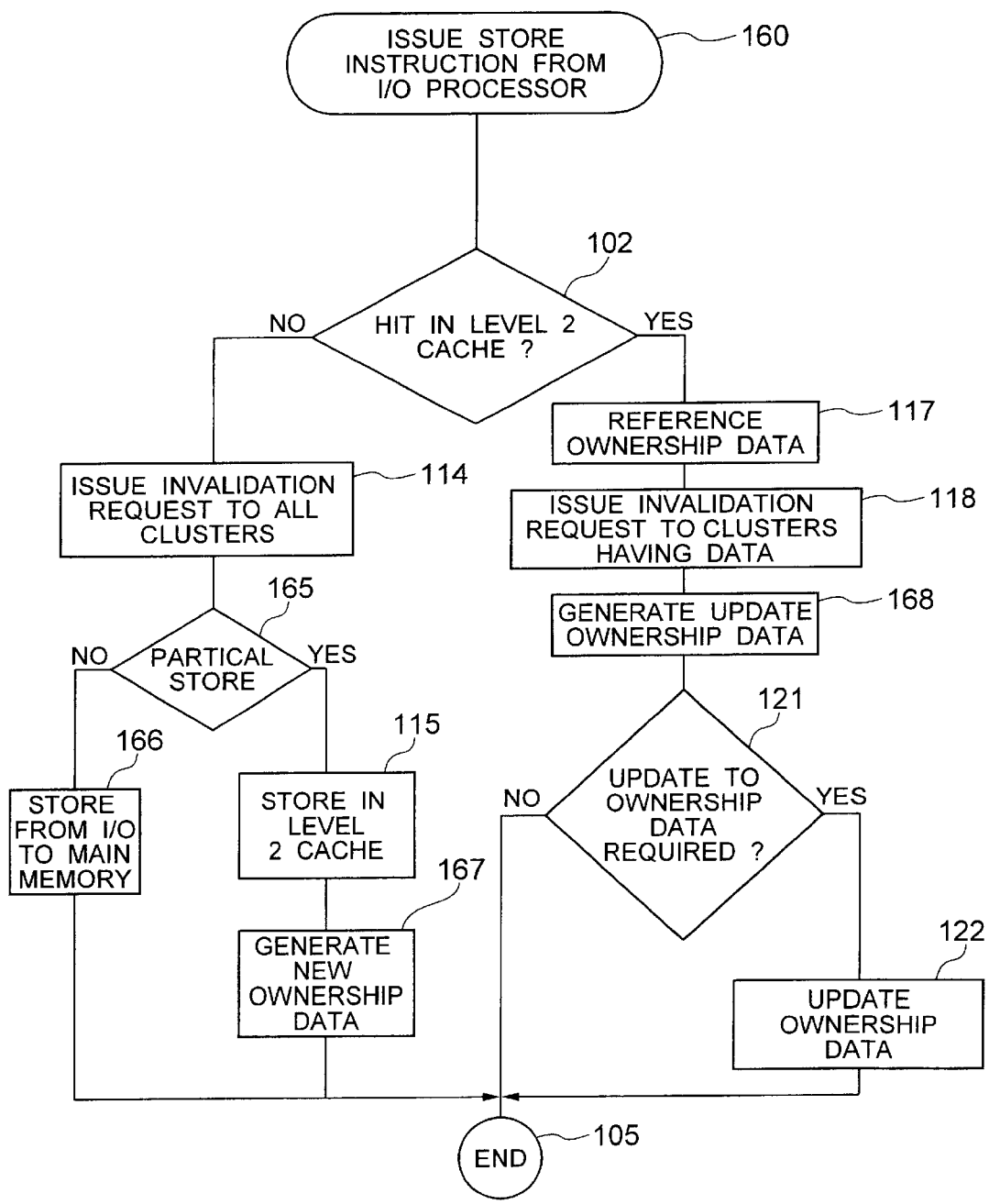

INFORMATION PROCESSING APPARATUS WITH CACHE COHERENCY

BACKGROUND OF THE INVENTION

Field of the Invention

The present invention relates to an information processing apparatus and in particular, to an information processing apparatus having a plurality of processors and a multi-hierarchical cache memory having cache coherency.

U.S. Pat. No. 5,943,684 discloses a data processing system having a first level cache and a second level cache.

Recently, the information processing apparatus has a plenty of processors for higher performance. An information processing apparatus having a plurality of processors includes a level 1 cache in each of the processors and a level 2 cache arranged in a system controller (SC) and shared by the processes, i.e., a cache memory having a more complicated hierarchical configuration.

However, in the information processing apparatus having a plurality of processors, when one of the processors has updated an address content, there should be no cache address not updated in the other processors. For this, if any such cache address exists, it should be invalidated or updated. In order to assure such a data coherence, means as will be detailed below has been used mainly.

Conventionally,,data coherence between caches is assured as follows. When a processor issues a store instruction, a store information to the cache of that processor is issued directly from the processor or the system controller (SC) so as to invalidate or update the cache of the address not updated in each of the processors. According to this method, each time a store instruction is issued, a store information should be issued to all the processors. Accordingly, as the number of the processors is increased, the use ratio of the path among the processors and the system controllers is increased by the plenty of store information issued by the processors.

In order to solve the aforementioned problems, there is also a method to provide the controller SC with a copy of a directory information of the level 1 cache in each of the processors. According to this method, since the controller SC has the directory having the address information of the caches of all the processors, when a store instruction is issued, the controller SC can issue an invalidation request only to the level 1 cache having the data of that address and thus it is possible to effectively use the bus. However, in this method, the controller SC should have directories corresponding to all the processors. Accordingly, as the number of the processors is increased, the logical amount is significantly increased.

There is also a method in which prior to issuing a store instruction, the caches of the addresses corresponding to all the other processors are invalidated and an exclusive fetch instruction is used so as to exclusively use the cache connected to the processor issuing the store instruction. In this method, at least one processor number having data of each line (data unit transferred from a cache to a memory) is recorded in the level 2 cache directory in the SC for each line, and prior to issuing a store instruction, an exclusive fetch instruction is issued, and an invalidation request is issued to the processor recorded in the directory in the SC, so that the data of that address is updated while not present in the cache of the other processor. In this method, the invalidation request need not be issued for each of the store and accordingly, it is possible to lower the use ratio of the bus among the controller SC and the processors. However, the system controller SC should have the cache information which have been contained in the respective processors. Accordingly, there is a restriction that the cache address of an upper hierarchy nearer to the processor should be completely included in the cache of a farther hierarchy. In this method, the aforementioned restriction requires that when a cache of a farther hierarchy is erased, all the caches in the nearer hierarchy should also be erased. This causes a problem that the number of cache invalidation is increased, which in turn increases the cache mismatch that a necessary data is absent in the cache.

As has been described above, the information processing apparatus having a plurality of processors and a memory hierarchy has various problems in keeping the cache coherence.

SUMMARY OF THE INVENTION

It is therefore an object of the present invention to provide an information processing apparatus having a reduced path busy ratio with a small logical amount in the controller SC without increasing the cache mismatch by use of a system controller for operating a multi-hierarchical cache memory connected to a plurality of processors.

According to the present invention, the aforementioned object can be achieved by an information processing apparatus comprising:

a plurality of clusters each including one or a plurality of processors, each said processor having a level 1 cache;

a memory accessed by one of said plurality of clusters for data stored therein; and a system controller connected to said memory and having a level 2 cache, said level 2 cache forming a hierarchical structure together with said level 1 cache, said system controller including:

a circuit for generating an invalidation request signal indicating whether or not a line of data accessed by one of said clusters is invalidated in said level 1 cache in response to an update to the line of data in said level 2 cache accessed from said one of said clusters and depending on the type of the access and a miss or a hit resulting from the access in said level 2 cache. In one aspect of the present invention, there is provided an information processing apparatus including a plurality of processors having a store-through type level 1 cache, a system controller having a store-in type level 2 cache shared by the plurality of processors, and a main storage device connected to the system controller, wherein the level 1 cache, the level 2 cache, and a main storage device are composed as a storage device having a hierarchical configuration. The system controller has a data ownership table as a list of processor numbers having the line data and invalidation request issuing means used when a store instruction is issued from the processor, for issuing a request for invalidating the level 1 cache of the address in a processor other than the processor which has issued the store instruction, according to the contents of the data ownership table.

Moreover, the aforementioned object can be achieved as follows. When the system controller is divided into a plurality of systems which can operate independently from one another and each system (interleave) issusres an invalidation request, the invalidation request issued is put into a queue, so that invalidation requests having different destination processor numbers are merged and issued simultaneously.

BRIEF DESCRIPTION OF THE DRAWINGS

FIG. 6,explains an invalidation request issuing to the respective requests.

FIG. 14 is a flowchart explaining a processing in the SC when the I/O processor issues a store instruction.

DETAILED DESCRIPTION OF THE EMBODIMENTS

Description will now be directed to an information processing apparatus according to an embodiment of the present invention with reference to the attached drawings.

Figure 1A:
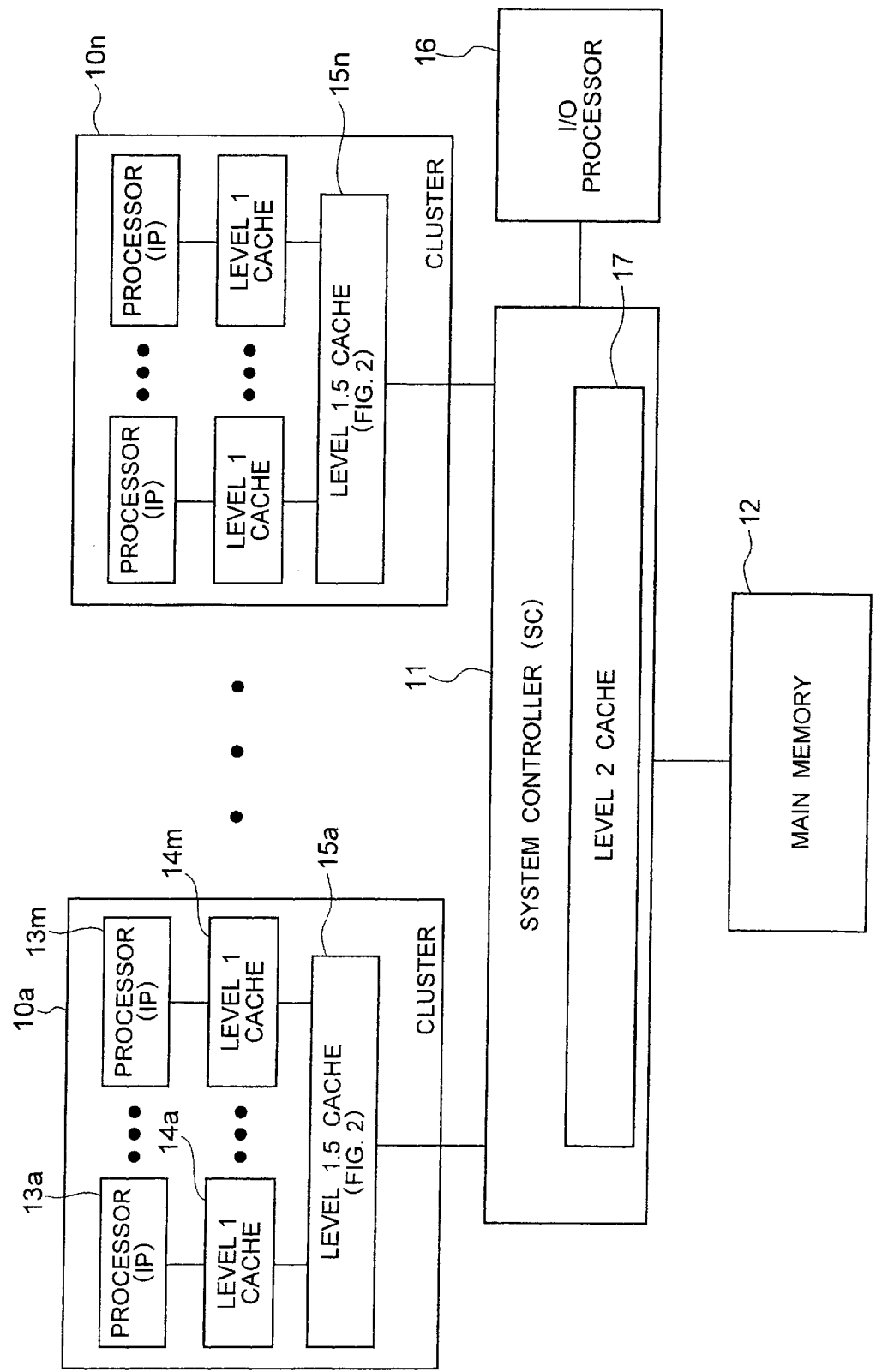
FIGS. 1A and 1B are block diagrams showing configuration of information processing apparatuses according to embodiments of the present invention.
Figure 2:
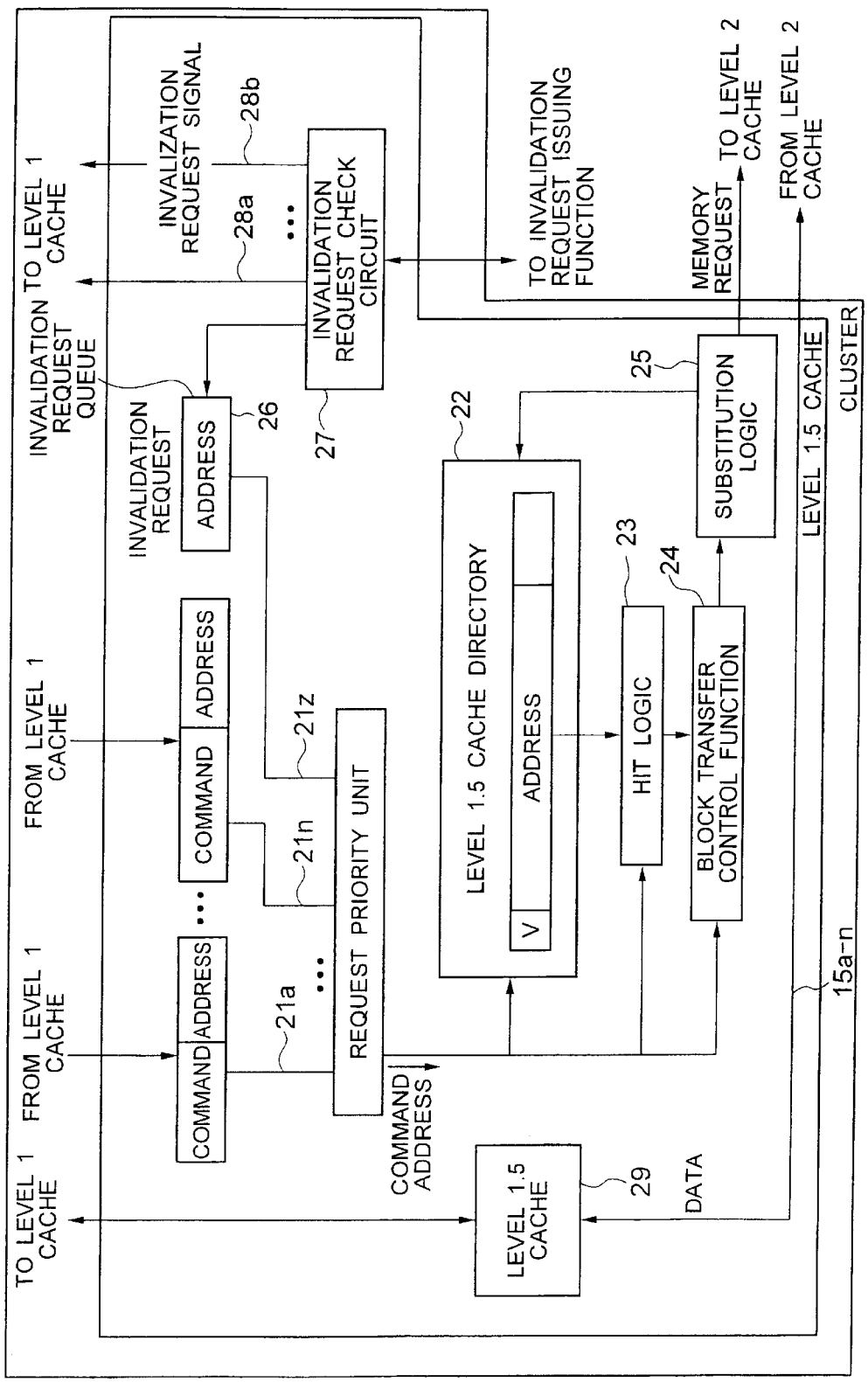
FIG. 2 is a block diagram showing a configuration of the level 1.5 cache control mechanism shown in FIG. 1A.
Figure 3:
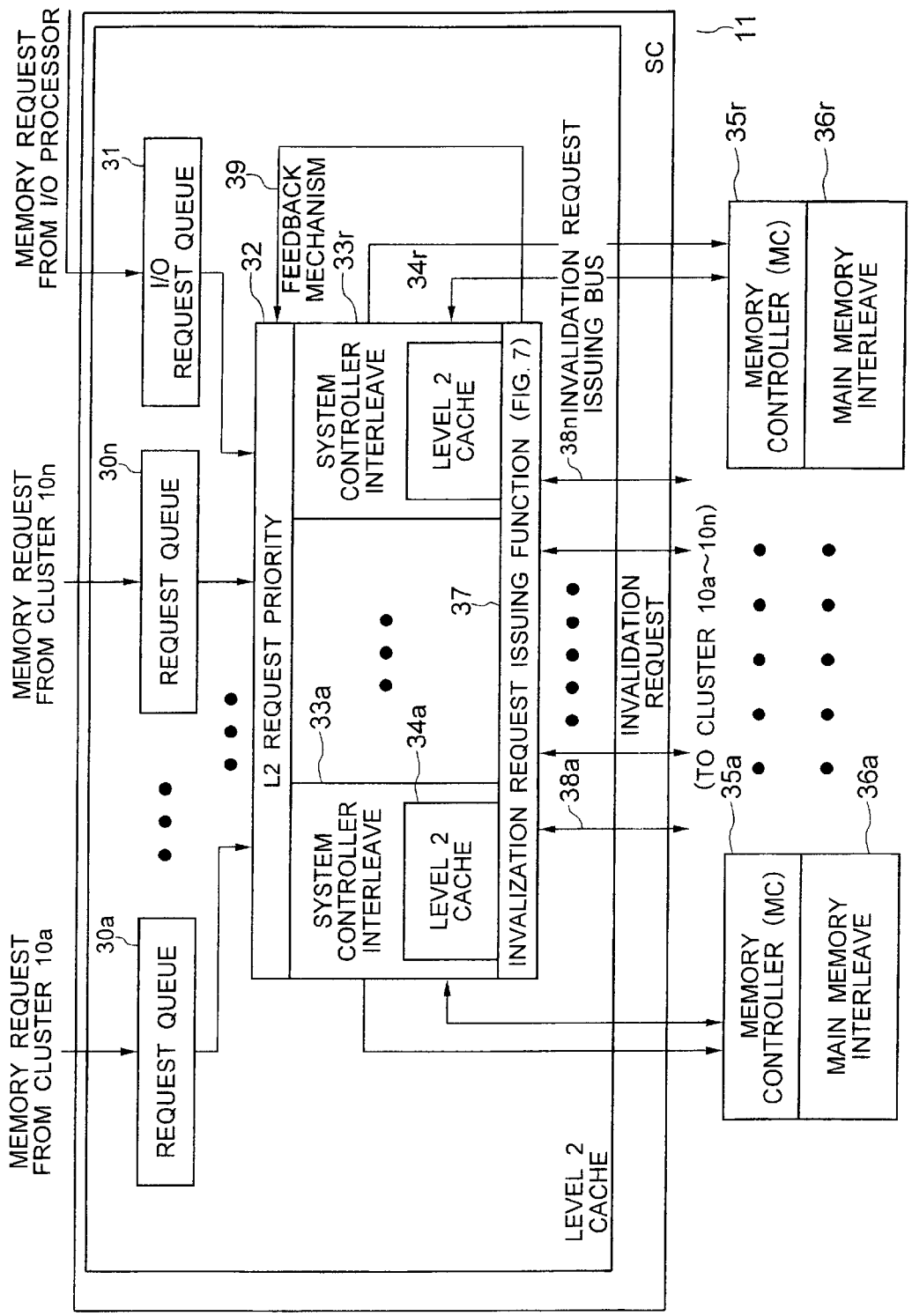
FIG. 3 is a block diagram showing a configuration of a system controller.
Figure 4:
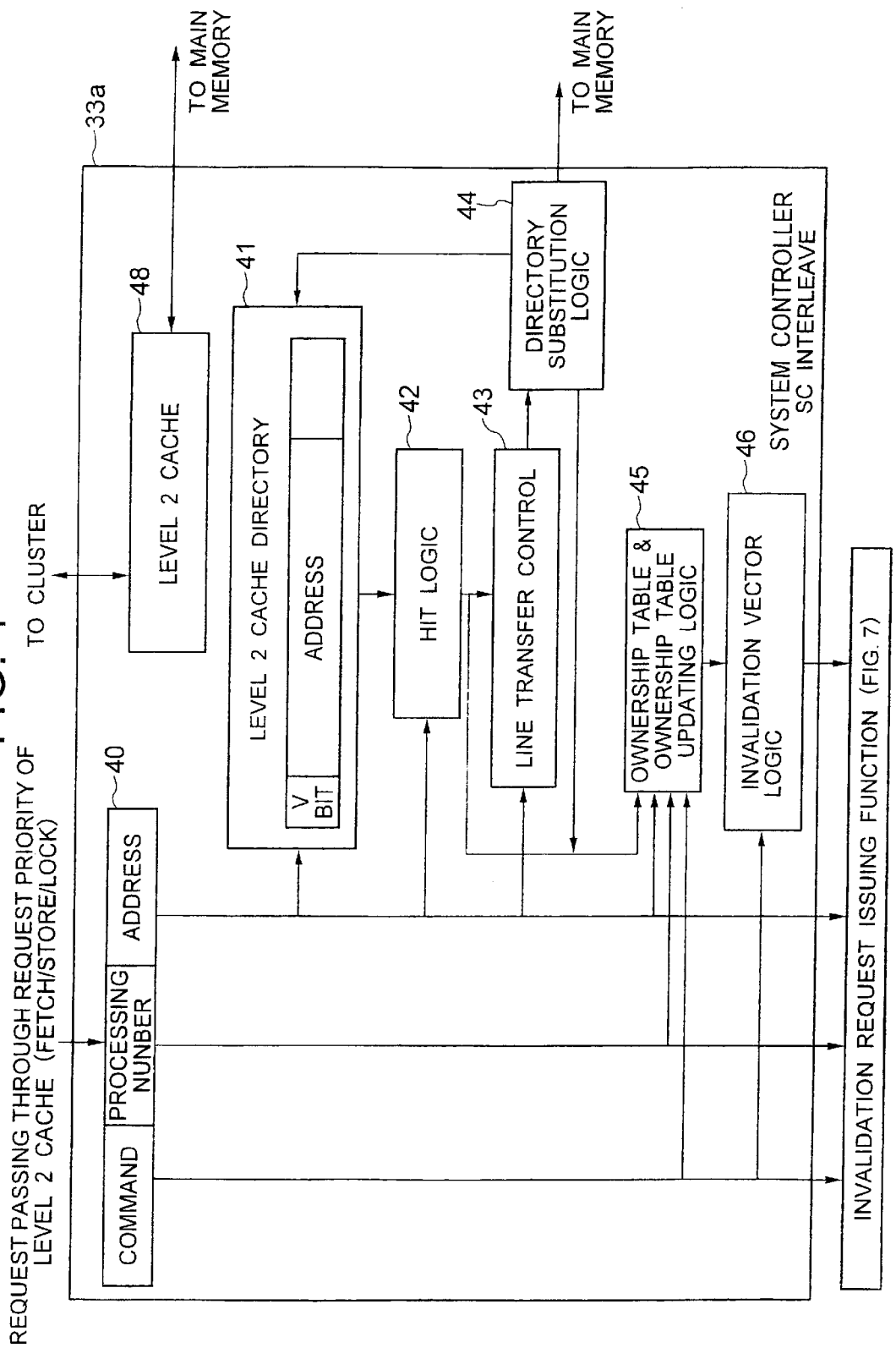
FIG. 4 explains a process of passing of a memory request through request priority and generation of an invalidation vector in the SC.

In FIGS. 1A and B and FIG. 2 to FIG. 4, reference numerals 10a to 10n are clusters, 11 is a system controller (SC), 12 is a, 13a to 13m are processors (IP) 14a to 14m are level 1 cache 15a to 15n are level 1.5 cache, 16 is an I/O processor, 17 is a level 2 cache, 20 is a request priority unit in a cluster, 22 is a level 1.5 cache directory 23 and 42 are hit logics 24 is a block transfer control function, 25 is a substitution logic, 27 is an invalidation request check circuit, 30a to 30n are request queues, 31 is an I/O request queue, 32 is a request priority, 37 is an invalidation request issuing function, 41 is a level 2 cache directory, 43 is a line transfer control logic, 44 is a directory substitution logic 45 is a ownership table & ownership table updating logic, and 46 is an invalidation vector logic.

In the information processing apparatus according to an embodiment of the present invention, as shown in FIGS. 1A and B, a plurality of clusters 10a to 10n having at least one instruction processor IP13a to 13m each having a level 1 cache are connected to the system controller SC11. In the SC 11, a level 2 cache 17 is arranged to be shared by the clusters. Referring to the embodiment shown in FIG. 1A, in each of the clusters 10a to 10n, level 1.5 cache 15a to 15n are arranged to be shared by the processsors in the cluster. Furthermore, in the SC11, an I/O processor 16 and a main memory 12 are connected.

In the information processing apparatus having the aforementioned configuration, when a processor IP in one of the clusters issues a fetch instruction and data of the address of the instruction exists in the level 1 cache (level 1 cache hit), data is fetched from the level 1 cache, and when no corresponding data exists, a fetch instruction is issued to the level 1.5 cache. In the case of cache miss in the level 1 and the in the level 1.5 cache, the fetch instruction reaches the level 2 cache. Moreover, memory access of all the store instructions from the IP reach the level 2 cache memory via the L1 cache and L1.5 cache and the data is stored or updated. When this access causes a cache hit in the level 1 and the level 1.5 cache, the data is updated in this case also. That is, in the embodiment of the present invention, the level 1 cache and the level 1.5 cache are of the store-through type and the level 2 cache is of the store-back or store-in type.

The memory request issued by the processor IP firstly accesses the level 1 cache 14a to 14m. However, in the case of the level 1 cache miss or the memory request is a store, the level 1.5 cache 15a in the cluster is accessed. Here, it is assumed that data transfer from the level 1.5 cache 15a to the level 1 cache 14a to 14m is performed with the data unit (128B in this embodiment), data transfer from the level 2 cache 17 to the level 1.5 cache 15a to 15n is performed with the data block (256B in this embodiment, and data transfer from the main memory 12 to the level 2 cache 17 is performed with the line basis (512B in this embodiment). Accordingly, data is loaded with data unit in the level 1 cache, and with block basis in the level 1.5 cache, and with line basis in the level 2 cache.

The level 1.5 cache control mechanism in the clusters 10a to 10n, as shown in FIG. 2, includes a request priority unit 20 in the cluster, a level 1.5 cache directory 22, a hit logic 23, a block transfer control function 24, a substitution logic 25, and an invalidation request check circuit 27.

Memory requests 21a to 21n having a command and an address from the level 1 cache and an invalidation request 21z are transferred to the request priority unit 20 in the cluster. The invalidation request 21z is issued from the system controller SC11 for data coherence between the processor and a cache having the request address, has a memory request which issues an invalidation request, and includes a processor number of I/Q processor number which has issued a store instruction and an address to be invalidated. The request priority unit 20 in the cluster processes these memory requests and the invalidation request according to a predetermined priority. A memory request selected by the request priority unit 20 in the cluster is sent to the directory 22 of the level 1.5 cache, where the hit logic 23 determines whether the data address to be accessed by the memory request is present in the level 1.5 cache 29. When the address is present, the validity bit attached to the address is cleared, thereby invalidating the corresponding contents of the cache.

When the memory request to be processed is a fetch instruction and the data of the address specified by the fetch instruction is not present in the level 1.5 cache, the block transfer control function 24 issues a data transfer request of the block of that address to the level 2 cache. When a block data is transferred from the level 2 cache to the cluster, the substitution logic 25 updates the level 1.5 directory 22 and loads a block data in the level 1.5 cache 29.

The invalidation request from the system controller SC is checked by the invalidation request check circuit 27, in the processor number of the I/O processor (which has issued the request) which has caused to issue the invalidation request. When this check result decides that (a) the request has been issued from another cluster or I/O processor, the data of the address present in the cache in the cluster is not the latest data and should be invalidated and the invalidation request check circuit 27 issues invalidation request signals 28a to 28n to all the level 1 caches. Furthermore, the invalidation request to level 1.5 cahce is stored in the invalidation request queue 26 in the cluster not depicted.

When this check result decides that (b) the invalidation request has been issued from a processor within the same cluster, let us consider that the level 1 cache and the level 1.5 cache are store-through and the request has been issued from a processor whose level 1 cache and the level 1.5 cache have been updated to the latest data. Accordingly, the data need not be invalidated. For this, the invalidation request is sent as the invalidation request signals 28a to 28m only to the level 1 cache of the processor other than the one which has issued the request. Moreover, the invalidation request check circuit 27 confirms that data invalidation by the invalidation request in all the level 1 and level 1.5 caches is complete and reports it to the request issuing function in SC.

The system controller SC11 has the level 2 cache as has been described. The SC11 used in the embodiment of the present invention, as shown in FIG. 3, is divided into a plurality of SC interleaves 33a to 33r, each of which may have level 2 caches 34a to 34r. Here, the main memory 12 is also divided into main memory interleaves 36a to 36r corresponding to these interleaves, each of which is provided with memory controls (MC) 35a to 35r.

The memory request issued from each cluster is stored in the request queue 30a to 30n. Moreover, the memory request from the I/O processor 16 is stored in the I/O request queue 31. The request priority 32 selects a request from the request queues 30a to 39n, 31 and distributes these requests to the respective SC interleave according to the address bit. The level 2 caches 34a to 34r provided in the SC interleaves 34a to 34r are connected to the MC 35a to 35r of the main memory interleaves 36a to 36r corresponding to the respective SC interleaves. The invalidation request issuing function 37 connects invalidation requests from all the SC interleave and issues an invalidation request to the respective clusters using the invalidation request issuing buses 38a to 38n. It should be noted that later explanation will be given on the detail of the invalidation request issuing function 37 and the feedback mechanism 39 from the invalidation request issuing function 37.

Next, referring to FIG. 4, explanation will be given on the process that memory request passes through the request priority in the controller SC11 so as to generate an invalidation vector. FIG. 4 shows an SC interleave in the SC11 including a level 2 cache directory 41, a hit logic 42, a line transfer control logic 43, a directory substitution logic 44, a ownership & ownership updating logic 45, and an invalidation vector logic 46.

In FIG. 4, the memory request 40 which has passed through the request priority firstly retrieves the directory 41 of the level 2 cache and determines whether the data is present in the level 2 cache 48 according to the hit logic 42. If the data is present in the level 2 cache (level 2 cache hit), an ownership table 45 corresponding to the directory of the level 2 cache is accesses and the ownership data corresponding to the line of the level 2 cache containing the data is referenced. This ownership data shows at least one cluster having the data unit containing this memory request data.

The invalidation vector logic 46 generates invalidation vectors by referencing the ownership table and the request type and sends them to the invalidation request issuing function which will be detailed later. This invalidation vector has the same number of bits as the cluster connected to the controller SC11, and a bit corresponding to the cluster having the data unit to be invalidated is set.

If no data corresponding to the request is present inv the level 2 cache (level 2 cache miss), then the line transfer control logic 43 transfers/loads the line containing this data from the main memory to the level 2 cache. Here, the directory substitution logic 44 updates the directory 41 of the level 2 cache 48. Since the level 2 cache directory 41 is updated, the a ownership data corresponding to the line of the ownership is recreated and initialized according to the request type. When the ownership data is initialized and the invalidation vector logic 46 determines that an invalidation request is to be issued, an invalidation vector is generated with necessary bits set in all the clusters and sent to the invalidation request issuing function.

Figure 5:
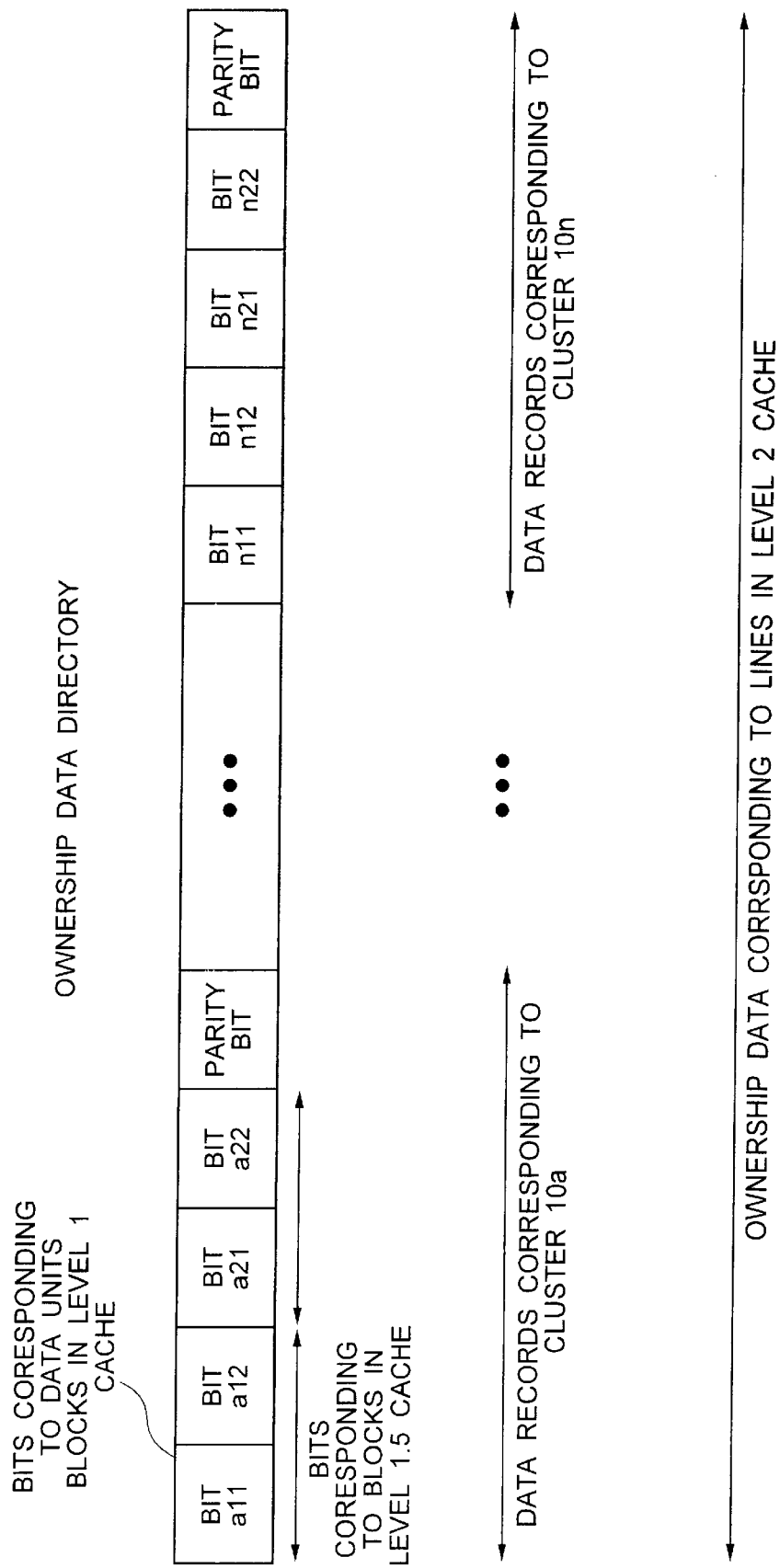
FIG. 5 explains a ownership data configuration corresponding to the respective lines of the level 2 cache in the ownership table.

The SC constitutes one ownership data corresponding to each line of he level 2 cache as shown in FIG. 5. As has been described above, since it is assumed that the level 2 cache line 512B and the level 1.5 cache block is 256B and the level 1 cache data unit is 128B, each line consists of two blocks and each block consists of two data units. Each line consists of of four data units.

The ownership data consists of the number of data records identical to the number of clusters and the respective data records correspond to the clusters. The data record has a bit corresponding to a data unit of the level 1 cache. When the cluster corresponding to the data record can have a data unit, as will be detailed later, the bit corresponding to the data unit is set. When the invalidation request is issued to the level 1 and the level 2.5 cache having the data unit in which this bit is set, in the level 1.5 cache, after data invalidation, the data is invalidated in block basis. After the data invalidation, the bit corresponding to the in validation data unit in the ownership data is cleared. The update logic in the ownership table 45 performs initialization of the ownership data by the level 2 cache mis, increase of the new owners by fetch, and updating of the ownership table 45 upon generation of decrease of owners when the invalidation request is issued.

Next, referring to FIG. 6, explanation will be given on the invalidation request issuing to a request performed by using the ownership data directory corresponding to the level 2 cache directory shown in FIG. 4.

Firstly, explanation will be given on a case when the processor issues a fetch instruction.

The processor issues a fetch instruction and the level 1, the level 1.5, and the level 2 caches are all cache miss, the line containing the data is transferred/loaded from the main storage to the level 2 cache, a block containing the data is transferred/loaded from the level 2 cache to the level 1.5 cache, and further the data unit is transferred/loaded from the level 1.5 cache to the level 1 cache. Here, a ownership data corresponding to the line is generated. Because it is unknown which processor has the data unit prior to issuing the fetch instruction, by using the logic circuit 45 for updating the ownership data of the ownership table realized in the RAM, all the bits corresponding to the data unit in the ownership data shown in FIG. 5 are set. Upon level 2 cache hit, a block containing the data is transferred/loaded from the level 2 cache to the level 1.5 cache and further a data unit is transferred/loaded from the level 1.5 cache to the level 1 cache. Here, all the bits corresponding to the data block (block 1) of the data record (FIG. 5) corresponding to the cluster containing the processor which has issued the ownership data fetch instruction corresponding to the line of the ownership table is set.

Next, explanation will be given on a casee when the processor issues a store instruction.

The processor issues a store instruction and the level 2 cache mise is caused, the line is transferred/loaded from the main storage to the level 2 cache and the data is stored on the line on the level 2 cache. Similarly as in the fetch instruction, a new ownership data is generated. However, because it is unknown which processor has the data unit before issuing the store instruction, it is assumed that the data is contained in all the clusters and the invalidation request is issued to all the clusters, for this, in the ownership data corresponding to this line of the ownership table, bits corresponding to all the data units in the cluster which has issued the store instruction are set. Clusters other than the cluster which has issued the store instruction, the bits corresponding to the data unit are cleared, and the bits corresponding to the data unit other than that are set upon level 2 cache hit, the data unit is stored in the level 2 cache. Here, an invalidation request is issued to the cluster having the data unit and accordingly, the bit corresponding to the data unit of the clusters other than the cluster which has issued the store instruction is cleared.

Next, explanation will be given on a case when the processor issues a lock instruction.

When the processor performs an exclusive access of data, the processor issues a "fetch & set lock" instruction and a "store & release lock" instruction. That is, the processor fetches and locks the data by the former instruction. Since the data locked cannot be accessed from another processor, it is possible to perform an exclusive processing. After this, the processor stores to processed data in the level 2 cache and releases, i.e., unlock the lock.

When the processor has issued the "fetch & set lock" instruction, an invalidation request is issued to the cluster having the data and accordingly, the bits corresponding to the data unit containing the data of all the clusters are cleared. The data transfer by this instruction performs a transfer of a data length directly required for the processor which has issued the request and no transfer is performed to the level 1 cache and the level 1.5 cache. Accordingly, upon level 2 cache hit, no data is transferred to the cache of the cluster which has issued the request. Accordingly, the ownership data of the cluster remains unchanged. Moreover, upon a L2 cache miss, a new ownership data is generated and all the bits for the accessed data unit other than the bits cleared by the invalidation request issued are set.

When the processor issues the "store & release lock", exclusive processing of the data has been performed and accordingly, upon a cache hit, no change is caused in the ownership data after issuing the "fetch & set lock" instruction. Upon a cache miss, a new ownership data is generated and all the bits other than those cleared when the "fetch & set lock" instruction was issued are cleared.

Next, explanation will be given on a case when the I/O processor issues a fetch instruction and a store instruction.

When the I/O processor issues the fetch instruction and a level 2 cache miss is caused, data is transferred directly from the main storage to the I/O without transferred to the level 2 cache and accordingly, the ownership data is no updated. Moreover, upon a cache hit also, since no cache memory is present in the I/O and the ownership data has no bit corresponding to the I/O, the ownership table is not updated.

Similarly, the ordinary I/O store instruction is directly stored in the main storage upon a level 2 cache miss and accordingly, the ownership data need not be updated. As an example other than the memory request given to the update logic in FIG. 6, it is possible to provide, instead of the fetch & set lock and the store & release lock, the lock and the release lock so as to constitute a combination of the fetch and the store.

Next, explanation will be given on a case when the I/O processor has a function to issue a partial store instruction.

The storage apparatus requires a complicated hardware for supporting 1-byte update. To evade this, a data length smaller than the line is stored once in the line of the level 2 cache and the line is written back to the main memory. This is called a partial I/O store method. When the I/O processor issues this partial store instruction and a cache miss is caused, the line is transferred/loaded from the main memory to the level 2 cache and stored in that line. Because an invalidation request is issued to all the clusters having the data unit, the ownership data bit corresponding to the data unit of all the clusters is cleared. Here, a new ownership data is generated and the other bits are set. Upon a cache hit, an invalidation request is issued to the cluster having the data unit. As a result, all the bits corresponding to the data unit of the ownership data are cleared. The update logic circuits of the information processing apparatus having no I/O processor need to have only a configuration corresponding to the memory request issued by the processor of the cluster.

Figure 7:
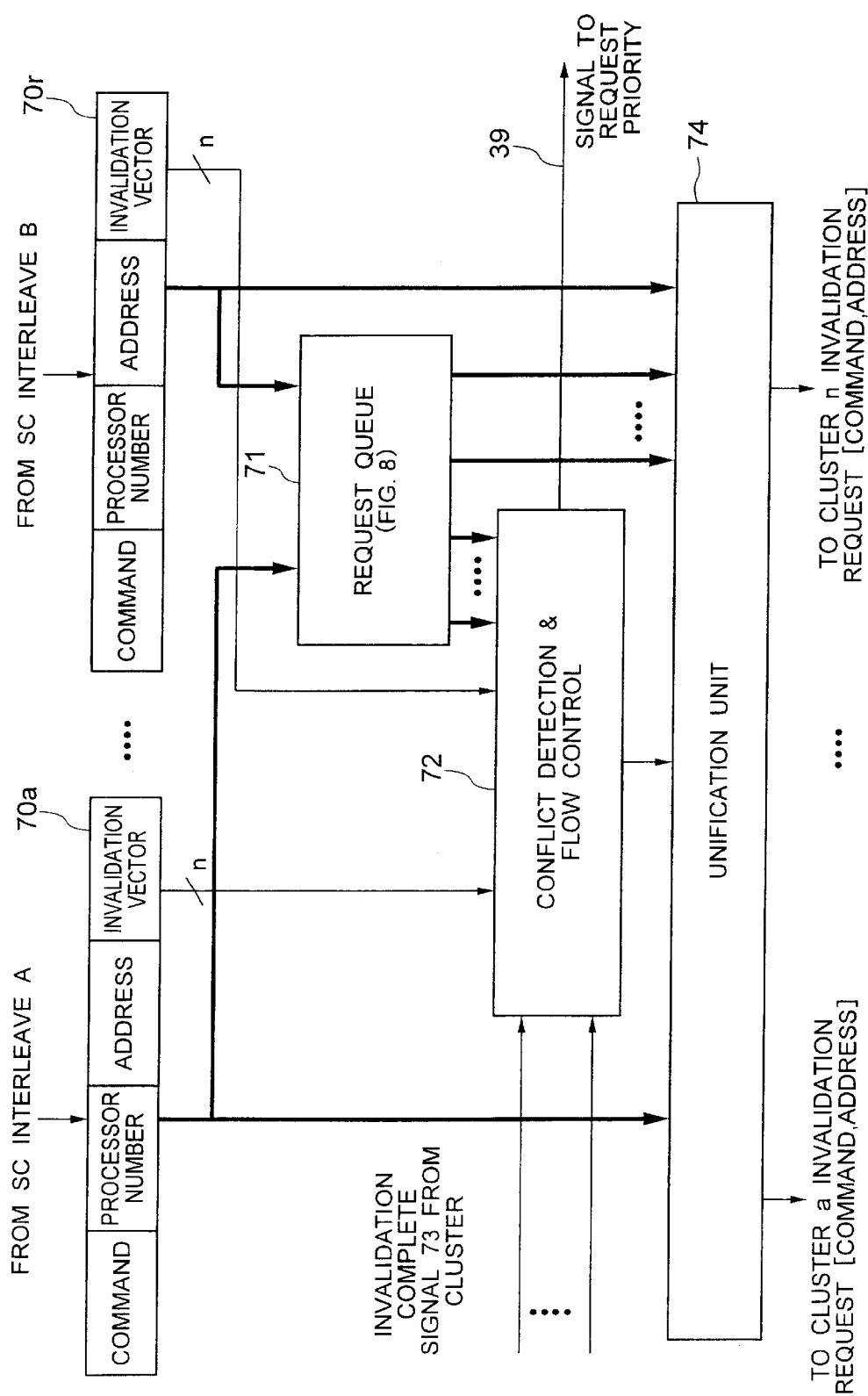
FIG. 7 is a block diagram showing a configuration of the invalidation request issuing function.
Figure 8:
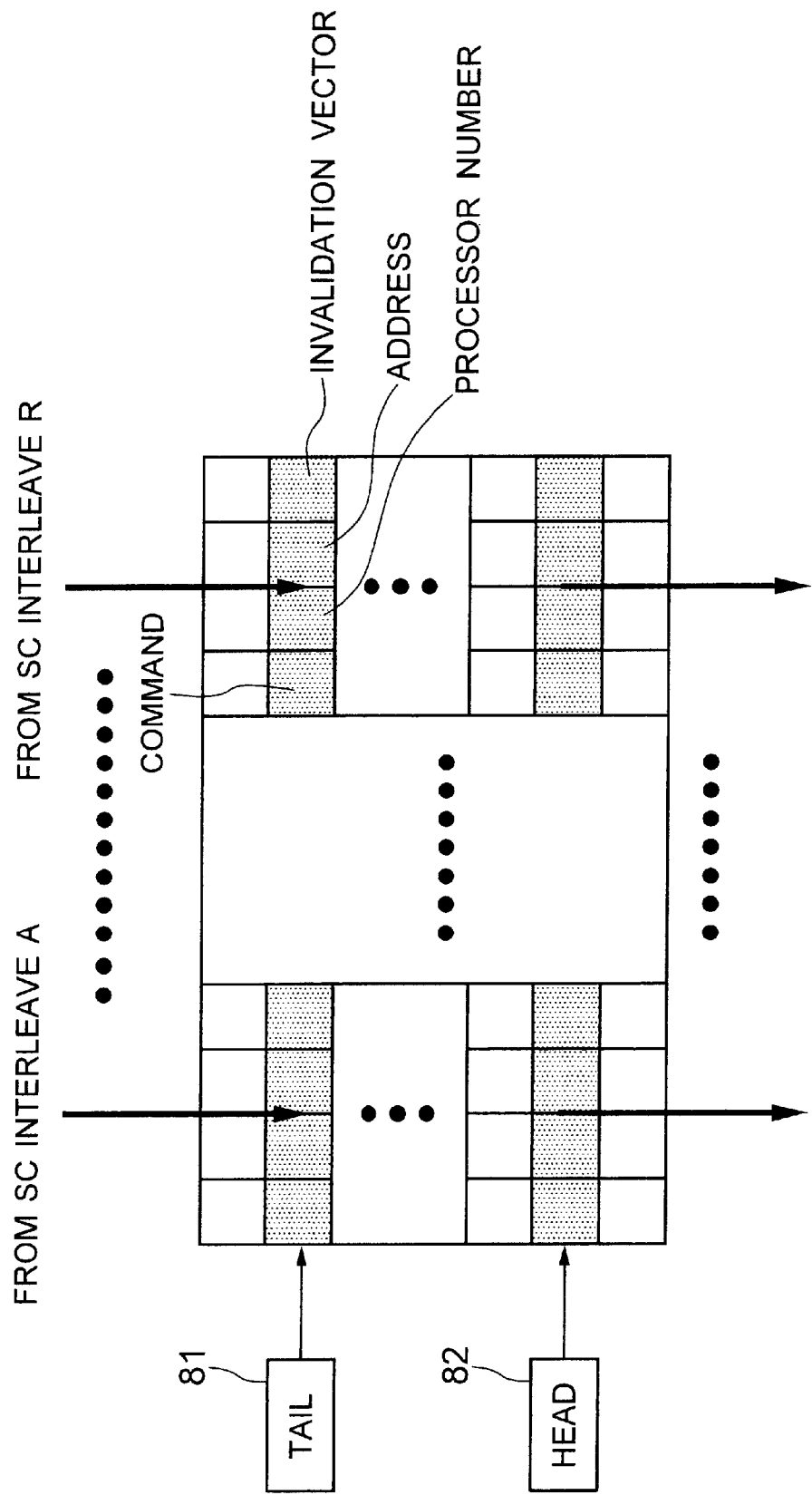
FIG. 8 explains a configuration of a request queue.

FIG. 7 is a block diagram showing a configuration of the invalidation request issuing function and FIG. 8 shows a configuration of a request queue. Hereinafter, explanation will be given on the invalidation request issuing function. The invalidation request issuing function 37 is a function to issue an invalidation request by using a memory request issued from the SC interleave processor and an I/O processor and an invalidation vector generated by the invalidation vector, logic explained with reference to FIG. 4.

In FIG. 7, a request issued from the SC and an invalidation vector are input to the request queue 71. It should be noted that the configuration and operation of the request queue 71 will be detailed later with reference to FIG. 8. The conflict detection logic of the conflict detection & flow control logic 72 compares the invalidation vectors 70*a* to 70*r* of the SC, to select a plurality of invalidation vectors having no duplicate bits corresponding to the same cluster. A unification unit 74 uses the plurality of invalidation vectors and requests and issues an invalidation request to the respective clusters. Here, the invalidation request contains the processors and I/O processor numbers which have issued the memory request causing to issue the invalidation request.

On the other hand, the flow control logic of the conflict detection & flow control logic 72 uses the number of the invalidation request issued and the invalidation complete signal 73 from the cluster so as to send a signal 39*d* to the request priority 32 before over flow of the invalidation request queue 26 not depicted, thereby enabling not to provide a request (all the store instructions and "fetch & set lock") on the interleave. Moreover, for the request queue 71 in the invalidation request issuing function 37, the flow control logic, similarly as in the preceding case, provides no request issuing an invalidation request from the request priority 32.

As shown in FIG. 8, the request queue 71 is arranged to correspond to the respective SC. The invalidation requests should be issued in the sequence of the generation of the invalidation vectors, i.e., request selection by the request priority 32 and accordingly, the request queue 71 is controlled by a head 82 and a tail 81 as pointers. Invalidation vectors issued from the SC are stored in the row corresponding to the SC indicated by the tail pointer 81 in the queue. Even when one SC issues an invalidation vector and it is stored in the queue, the tail 81 recesses by 1 and the next invalidation vector is stored in the line indicated by the tail. The conflict detection logic checks overlap of the corresponding bits in the same cluster of the invalidation vector and recesses the head 82 by 1 to check the next line when all the invalidation vectors are provided. When the head 82 and the tail 81 indicate the same line, i.e., when the queue is empty, the conflict detection logic directly checks the invalidation vector input from the SC.

Depending on the number of SC and frequency of the request issuing an invalidation request, the invalidation vector generation frequency is increased than the frequency of issuing an invalidation request to the clusters. In this case, the throughput in the unification unit 74 may limit the throughput of the entire system. To solve this problem, in the embodiment of the present invention, it is possible to issue more invalidation requests from the invalidation vector generated by one conflict detection at once by using a plurality of unification units. Moreover, keeping the sequence, it is possible to detect not only the head of the request queue and the next invalidation vector, thereby enabling to issue an invalidation request more effectively.

Figure 1B:
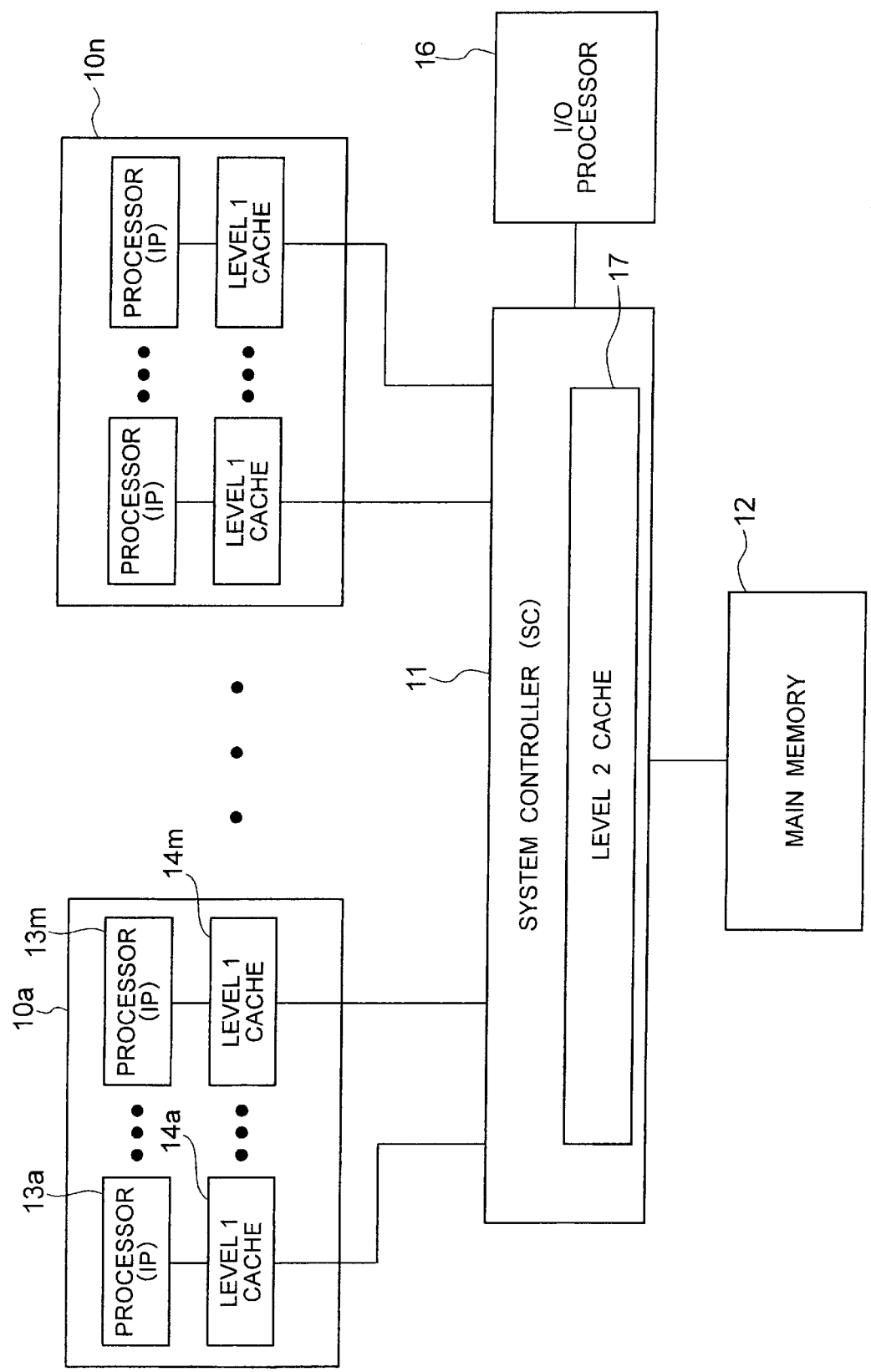
Figure 9:
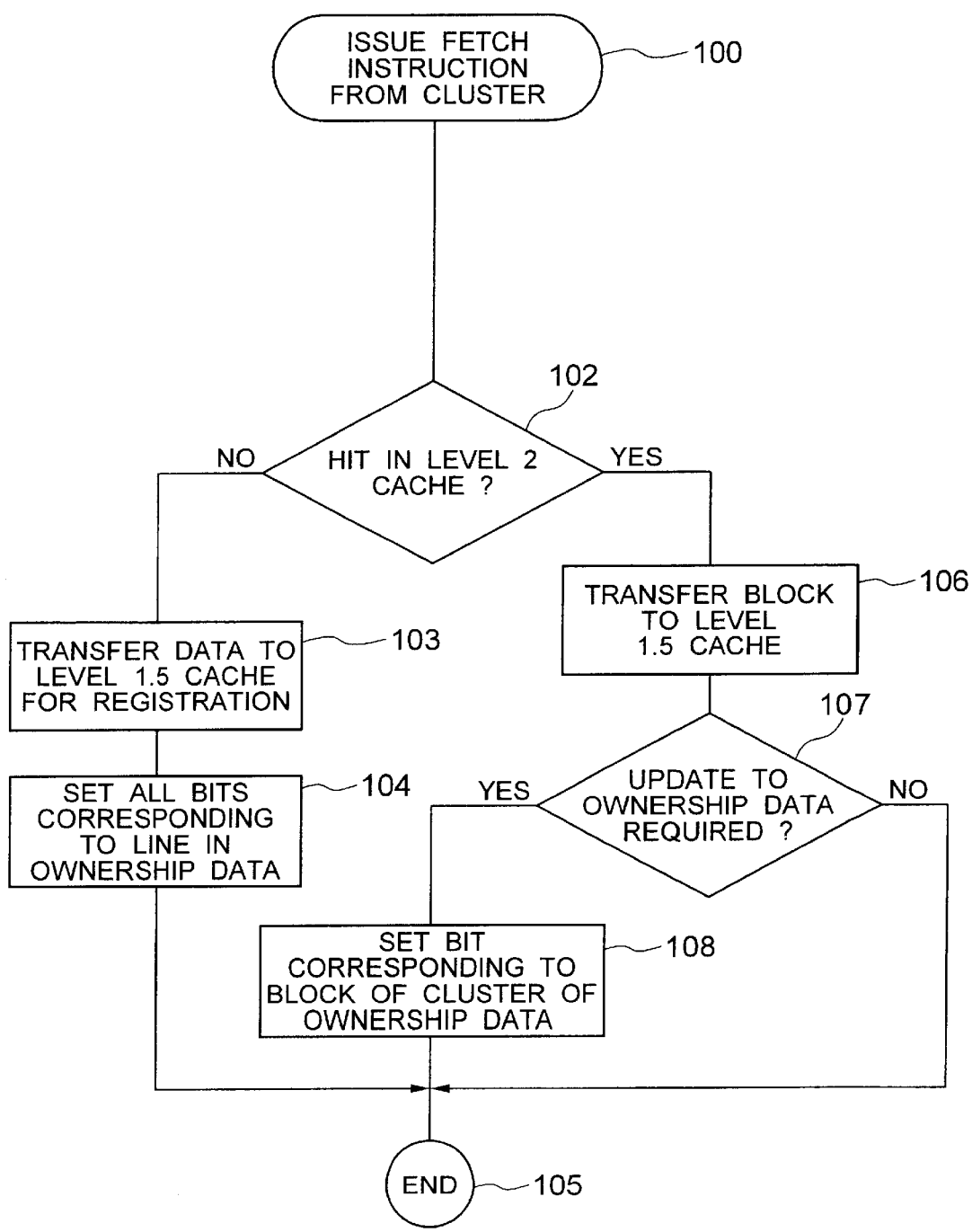
FIG. 9 is a flowchart explaining a processing in the SC when a cluster issues a fetch instruction.

FIG. 9 is a flowchart explaining the processing in the SC when the cluster issues a fetch instruction. Hereinafter, explanation will be given on this. Here, the level 2 cache shown in FIGS. 1A and 1B is controlled by the SC and the level 1 cache and the level 1.5 cache are controlled by the level 1 cache controller and the level 1.5 cache controller not depicted.

(a) When the cluster has issued a fetch instruction, it is retrieved whether the corresponding data is present in the level 2 cache (steps 100 and 102).

(b) When a level 2 cash miss is caused in the retrieve in step 102, the main memory transfers a line containing data corresponding to the level 2 cache. The SC loads this line and updates the directory of the level 2 cache, and loads/transfers a block from the level 2 cache to the level 1.5 cache (step 103).

(c) In the processing of step 103, the processor having the data of the substituted line is unknown and accordingly, assuming that all the processors and clusters have the line data, the SC sets the bit of all the data units contained in the line on all the clusters by the logic (see FIG. 6) and completes the processing for the cache mmiss (steps 104 and 105).

(d) When a level 2 cache hit is caused in the retrieval of step 102, a block containing a corresponding data is transferred to be loaded from the level 2 cache to the level 1.5 cache.

(e) After the processing in step 106, the SC compares the ownership data to a new ownership data and determines whether they are different, i.e., the current ownership data shown in FIG. 5 is to be updated or not (step 107). If no modification is to be made, the processing is complete here, and if modification is required, the bit corresponding to all the data units in the block of the cluster of the ownership data of the ownership table is set by the output of the logic 45. Thus, the cluster fetch processing is complete (step 105).

Figure 10:
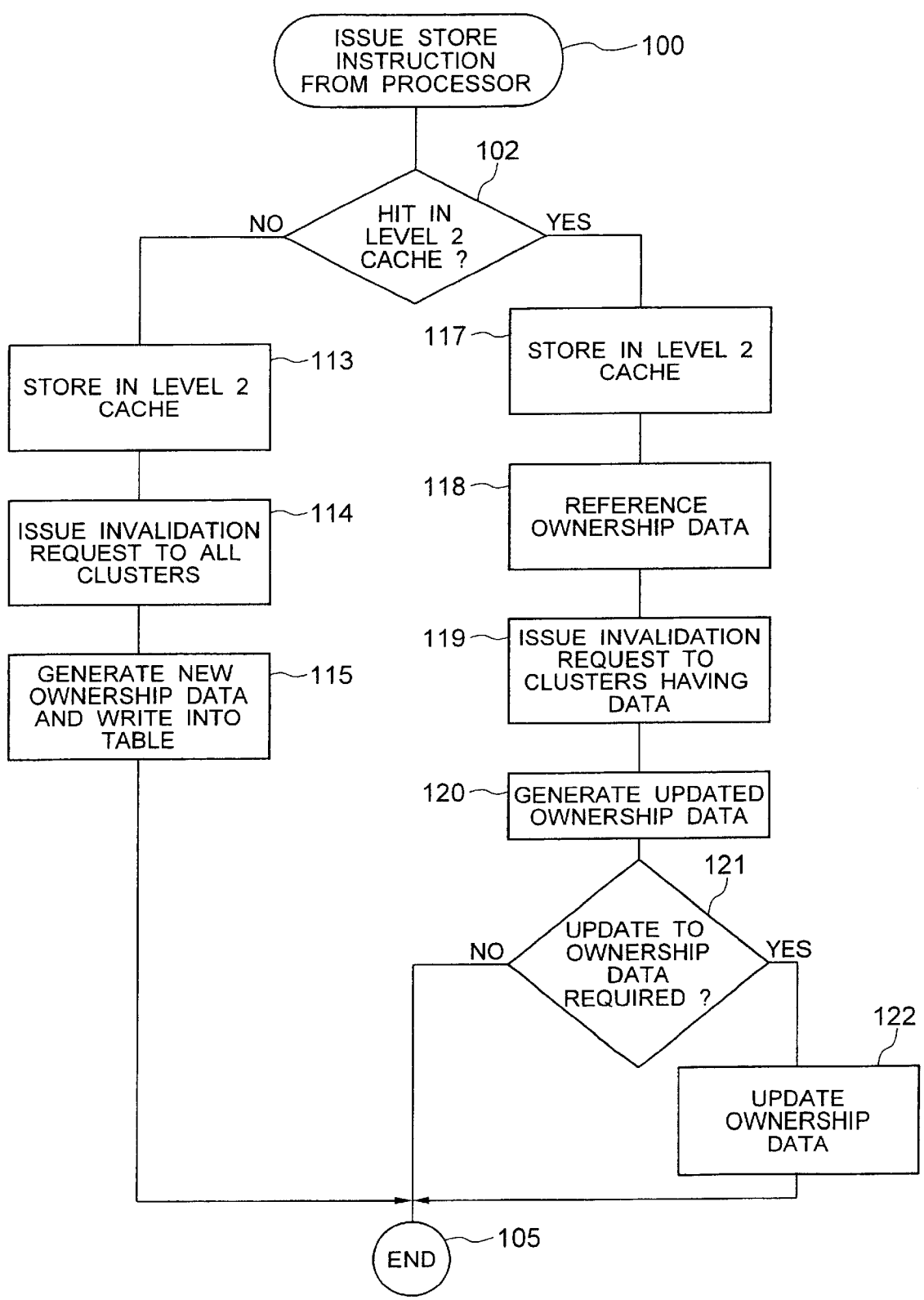
FIG. 10 is a flowchart explaining a processing in the SC when the processor issues a store instruction.

FIG. 10 is a flowchart explaining processing in the SC when the processor issues a store instruction. Hereinafter, explanation will be given on this.

(a) When the processor has issued a store instruction, in the same way as the fetch from the cluster explained in FIG. 9, it is retrieved whether a corresponding data is present in the level 2 cache (steps 110 and 102).

(b) If a level 2 cache miss is caused in the retrieval in step 102, the main memory transfers/loads the line containing the corresponding data in the level 2 cache and the SC stores the store data from the processor in the line (step 113).

(c) Because the owner of the data unit is unknown and an invalidation request is issued to all the clusters, this invalidation request results in that the data unit is not present in the other cluster.

(d) The SC (e) When a level 2 cache hit is caused in the retrieval of step 102, the SC stores the data in the line in the level 2 cache (step 117) and references the ownership data of the corresponding line of the level 2 cache, i.e., invalidation data from the ownership table (step 118).

(f) Next, using the invalidation data referenced by step 118, the invalidation request issuing function issues an invalidation request to all the clusters having the data unit. To generate a new ownership table by issuing an invalidation request, a new ownership table invalidation data is generated as shown in FIG. 6 (steps 119, 120).

(g) The preceding invalidation data is compared to the new invalidation data so as to determine whether the ownership data is to be updated. If they are identical and no modification is required, the processing is complete here. If modification is required, the ownership table is updated by the new invalidation data and the processing upon a cache hit at processor store is complete (steps 121, 122, and 105).

Figure 11:
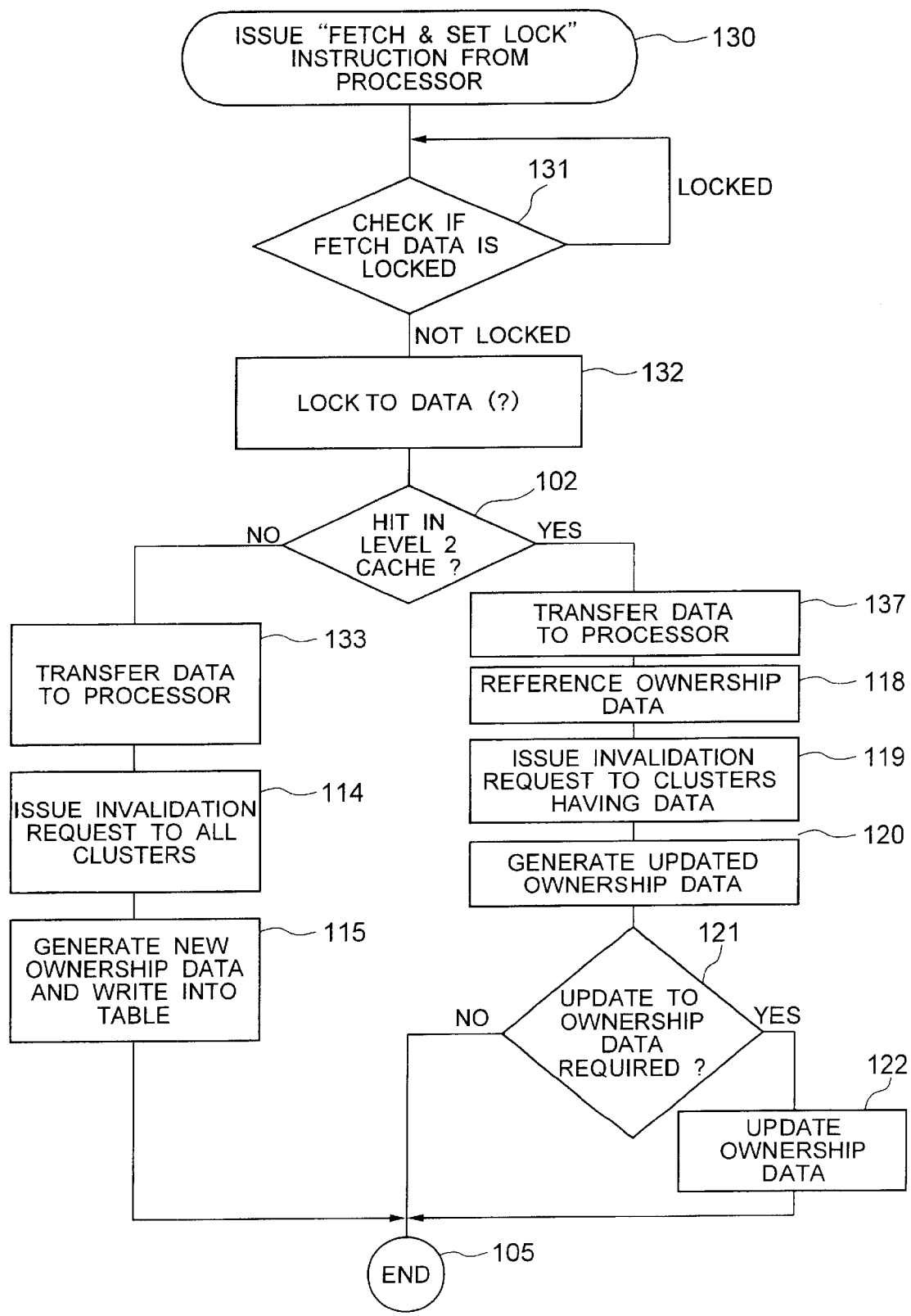
FIG. 11 is a flowchart explaining a processing in the SC when the processor issues a "Fetch & Set Lock" instruction.

FIG. 11 is a flowchart explaining the processing in the SC when the processor has issued the "fetch & set lock" instruction. Hereinafter, explanation will be given on this.

(a) When the processor issues a "fetch & set lock" instruction, this request performs whether the fetch data is locked by another processor. If it is locked, wait state continues until the lock is unlocked (step 131).

(b) After confirming that the other processor is not locked in step 131, the data is locked and in the same way as in FIG. 9 and FIG. 10, retrieval is performed to determine whether a corresponding data is present in the level 2 cache (steps 132 and 102).

(c) If the retrieval in step 102 results in a level 2 kache miss, the line containing the corresponding data is transferred/loaded from the main memory to the level 2 cache and the data is transferred to the processor without modifying the level 1 cache and the level 1.5 cache (step 133).

(d) After this, in the same as the store instruction of the processor explained in FIG. 10, an invalidation request is issued to all the clusters, and a new ownership data is generated to complete the processing for the cache miss (steps 114, 115, and 105).

(e) In the case of level 2 cache hit in the retrieval of step 102, the data is transferred to the processor (step 137).

(f) After this, in the same way as in FIG. 10, an invalidation request is issued to update the ownership table and the processing when the "fetch & set lock" instruction is issued by the processor is complete (steps 118 to 122, 105).

Figure 12:
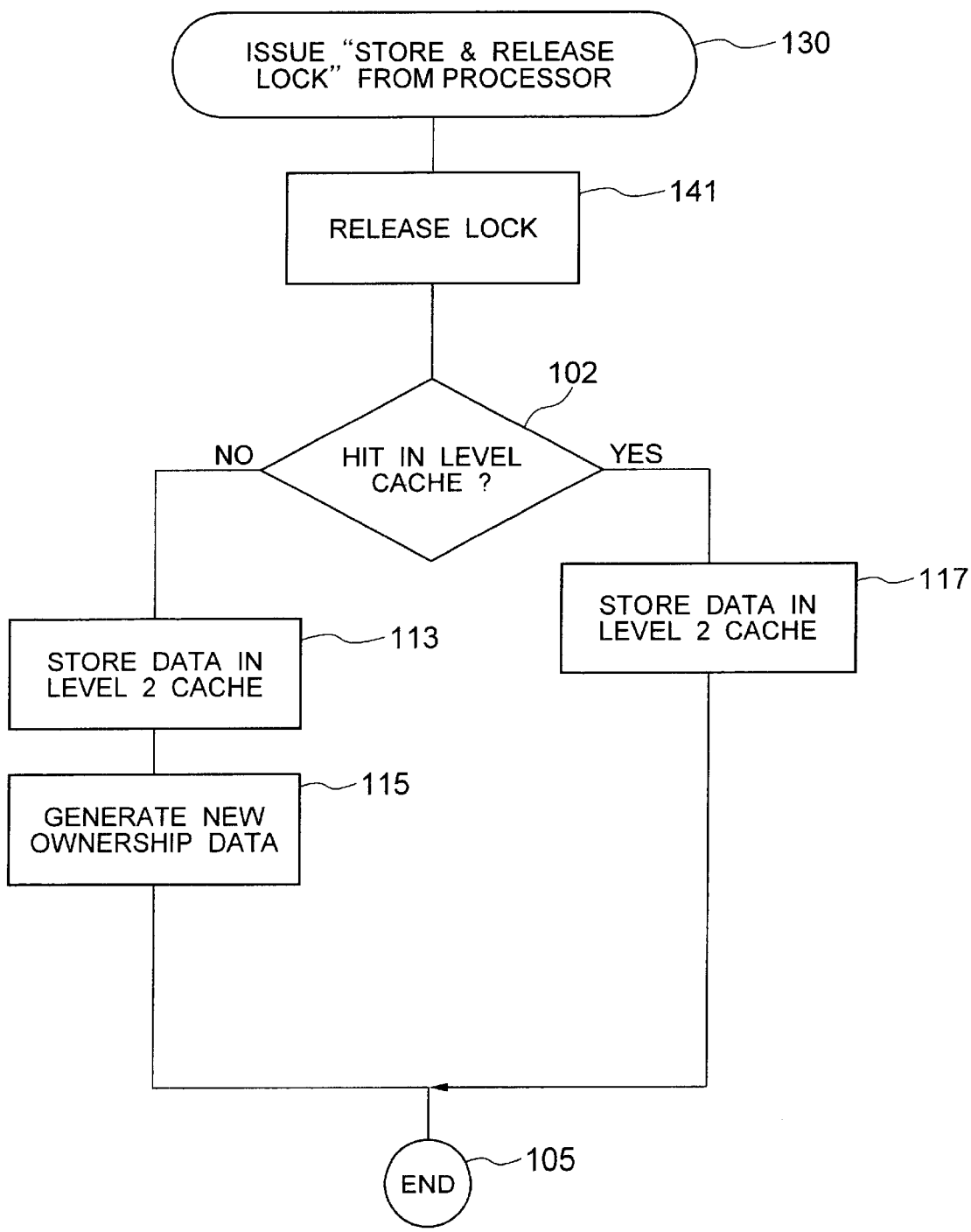
FIG. 12 is a flowchart explaining a processing in the SC when the processor issues a "Store & Release Lock" instruction.

FIG. 12 is a flowchart explaining the processing performed in the SC when the processors issues the "store & release lock" instruction. Hereinafter, explanation will be given on this. It should be noted that the "store and release lock" instruction is issued in pair with the "fetch and set lock" instruction. An exclusive OR is performed between the "fetch & set lock" instruction and the store & release lock" instruction. The former instruction issues an invalidation request and updates the ownership table and accordingly, the processes are not required in the latter instruction. However, if data is cast out from the level 2 cache between the former and the latter and the ownership table is substituted, the ownership table should be updated.

(a) When the processor issues the "store & release lock" instruction, firstly, the data lock in the main storage is unlocked and in the same way as in FIG. 9 and FIG. 10, it is retrieved whether a corresponding data is in the level 2 cache (steps 140, 141, and 102).

(b) When the retrieval of step 102 results in a level 2 cache miss, data is line-transferred from the main memory to the level 2 cache and stored. Furthermore, in the same way as in the ordinary store, a data record of a new cache line of the ownership table is set to update the ownership table, thereby completing the processing (steps 113, 115, and 105).

(c) When the retrieval of step 102 results in level 2 cache hit, the data is stored in the level 2 cache, thereby completing the processing performed when the processor issues the "store & release lock" instruction.

Figure 13:
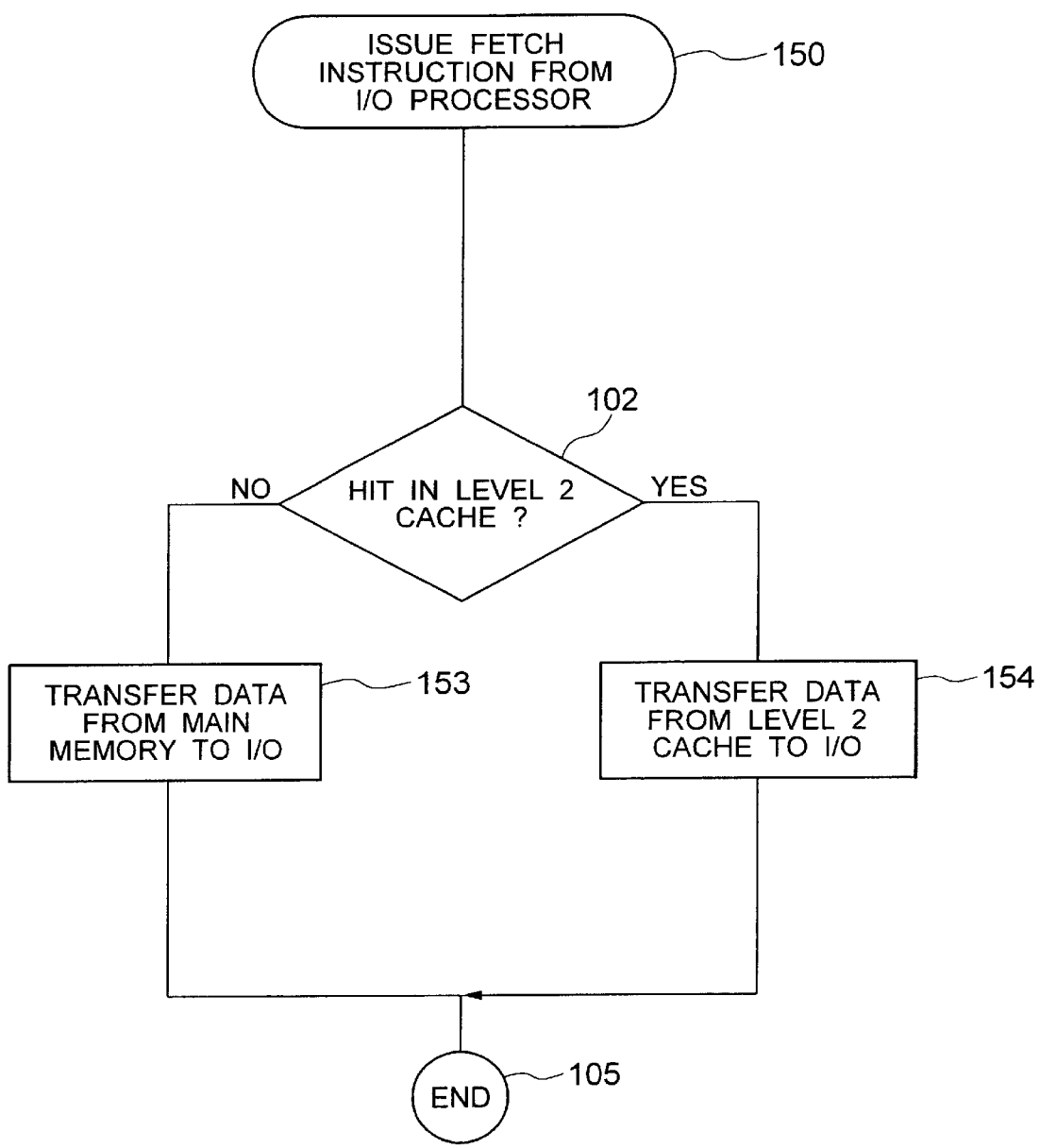
FIG. 13 is a flowchart explaining the processing in the SC when the I/O processor issues a fetch instruction.

FIG. 13 is a flowchart explaining the operation in the SC when the I/O processor issues the fetch instruction. Hereinafter, explanation will be given on this.

(a) When the I/O processor issues a fetch instruction, the level 2 cache is retrieved to determine whether data of that address is present. If this results in a level 2 cache miss, the data of the corresponding line is transferred directly from the main memory to the I/O processor, thereby completing the processing (steps 150, 102, 153, and 105).

(b) When the retrieval of step 102 results in a cache hit, data is transferred from the level 2 cache to the I/O processor, thereby completing the fetch processing from the I/O processor (steps 154 and 105).

FIG. 14 is a flowchart explaining the processing performed in the SC issued by the store instruction by the I/O processor. Hereinafter, explanation will be given on this.

(a) When the I/O processor issues a store instruction, the level 2 cache is retrieved whether the level 2 cache contains the data (steps 160 and 102).

(b) When the retrieval of step 102 results in a level 2 cache miss, an invalidation request is issued to all the clusters and then it is determined whether this request is a partial store. In the case of an ordinary store instruction instead of the partial store, data is stored directly from the I/O processor to the main memory, thereby completing the processing (steps 165, 166, and 105).

(c) When the request made in step in 165 is a partial store, the line containing the address of the data is transferred/loaded from the main memory to the level 2 cache and stored in the level 2 cache. An invalidation data bit corresponding to the data unit containing corresponding data of all the clusters is set to generate a new ownership data, thereby completing the processing (steps 115, 167, and 105).

(d) When the retrieval of step 102 results in a level 2 cache hit, the owner data corresponding to the data is referenced and an invalidation request is issued to the cluster having the data (steps 117 and 118).

(e) An invalidation data is generated as explained in FIG. 6 so as to update the ownership table by issuing an invalidation request and the preceding invalidation data is compared to the new invalidation data to determine whether the owner data is to be updated. If no update is required, the processing is complete as it is (steps 168, 112, and 105).

(f) The comparison between the preceding invalidation data and the new invalidation data in step 121 results in that the owner data is to be updated, the ownership table is updated by the invalidation data, thereby completing the processing at the store instruction issued from the I/O processor (steps 122 and 105).

The present invention can also be applied to an embodiment of an information processing apparatus including a plurality of processors having store-through type level 1 cache and a system controller connected to the processors and having a store-in type level 2 cache shared by the plurality of processors, wherein the level 1 cache, the level 2 cache, and the main memory are composed as a storage apparatus of multi-hierarchical configuration.

What is claimed is:

1. An information processing apparatus comprising:

a plurality of clusters each including one or a plurality of processors, each said processor having a level 1 cache;

a memory accessed by one of said plurality of clusters for data stored therein; and a system controller connected to said memory and having a level 2 cache, said level 2 cache forming a hierarchical structure together with said level 1 cache, said system controller including:

a circuit for supplying a directory with a signal indicating whether or not data accessed by a cluster is invalidated in accordance with a predetermined condition depending on the type of an access request from said cluster; and an ownership data directory having invalidation data corresponding to an update to accessed data in said level 2 cache.

2. An information processing apparatus according to claim 1, wherein:

said directory is a random access memory (RAM).

3. An information processing apparatus according to claim 2, wherein:

said circuit supplies each of lines of accessed data with a predetermined flag set signal which is determined in accordance with whether an access in said level 2 cache results in a hit or a miss and whether for said processor which has issued the access or another processor, and said directory receives an output of said circuit to set therein a bit indicating whether or not accessed data should be invalidated for each of the processors included in said clusters with respect to said data lines.

4. An information processing apparatus according to claim 3, wherein:

each said cluster includes an invalidation request queue for receiving an invalidation bit from said directory, putting said invalidation bit into a queue, and issuing an invalidation request.

5. An information processing apparatus according to claim 4, wherein:

each said cluster includes a cluster request priority unit for holding said invalidation request and memory requests from said clusters, and a cache 1 directory connected to said cluster request priority unit for setting a validity bit for an accessed data address in response to said invalidation request.

6. An information processing apparatus according to claim 5, wherein:

each of said plurality of clusters includes a level 1.5 cache placed between said level 1 cache and said level 2 cache for forming the hierarchical structure therewith, wherein said invalidation request issued from said system controller is sent to said level 1.5 cache for invalidating accessed data.

7. An information processing apparatus according to claim 6, wherein:

said memory has a structure comprised of a plurality of memory interleaves; and said system controller includes a request queue for individually holding memory requests from said plurality of clusters, a structure comprised of a plurality of system controller interleaves corresponding to said structure comprised of the plurality of memory interleaves, and a request priority circuit for receiving said memory requests and distributing said memory requests to said plurality of system controller interleaves in accordance with an accessed address.

8. An information processing apparatus according to claim 1, wherein:

said circuit of said system controller generates an invalidation request signal indicating whether or not a line of data accessed by one of said clusters is invalidated in response to an update to a line of data in said level 2 cache accessed from said one of said clusters and in accordance with the type of the access and a miss or a hit resulting from the access to said level 2 cache.

9. An information processing apparatus according to claim 8, wherein:

each said cluster includes a cluster request priority unit for holding said invalidation request and memory requests from said clusters, and a cache 1 directory connected to said cluster request priority unit for setting a validity bit for an accessed data address in response to said invalidation request.

10. An information processing apparatus according to claim 9, wherein:

each of said plurality of clusters includes a level 1.5 cache placed between said level 1 cache and said level 2 cache for forming the hierarchical structure therewith, wherein said invalidation request issued from said system controller is sent to said level 1.5 cache for invalidating accessed data.

11. An information processing apparatus comprising:

a plurality of clusters each including one or a plurality of processors, each said processor having a level 1 cache;

a memory accessed by one of said plurality of clusters for data stored therein; and a system controller connected to said memory and having a level 2 cache, said level 2 cache forming a hierarchical structure together with said level 1 cache, said system controller including:

a circuit for generating an invalidation request signal indicating whether or not a line of data accessed by one of said clusters is invalidated in said level 1 cache in response to an update to the line of data in said level 2 cache accessed from said one of said clusters and depending on the type of the access and a miss or a hit resulting from the access in said level 2 cache.

12. An information processing apparatus according to claim 11, wherein:

said circuit generates an invalidation request signal indicating whether or not accessed data corresponding to one of said clusters is invalidated in the level 1 caches in said plurality of clusters other than said one cluster in response to an update to data in said level 2 cache accessed from said one cluster and depending on the type of the access and a miss or a hit resulting from the access in said level 2 cache.

13. An information processing apparatus according to claim 12, wherein:

each of said plurality of cluster has a priority unit for receiving and holding said invalidation request signal and memory requests, and sending said memory requests one by one to said cache directory in accordance with a predetermined priority rule.

14. An information processing apparatus according to claim 13, wherein:

each of said plurality of clusters includes a level 1.5 cache placed between said level 1 cache and said level 2 cache for forming the hierarchical structure therewith, wherein said invalidation request issued from said system controller is sent to said level 1.5 cache for invalidating accessed data.

15. An information processing apparatus according to claim 14, wherein:

said memory has a structure comprised of a plurality of memory interleaves; and said system controller includes a request queue for individually holding memory requests from said plurality of clusters, a structure comprised of a plurality of system controller interleaves corresponding to said structure comprised of the plurality of memory interleaves, and a request priority circuit for receiving said memory requests and distributing said memory requests to said plurality of system controller interleaves in accordance with an accessed address.

16. An information processing apparatus according to claim 11, wherein:

each of said plurality of clusters includes a level 1.5 cache placed between said level 1 cache and said level 2 cache for forming the hierarchical structure therewith, wherein said invalidation request issued from said system controller is sent to said level 1.5 cache for invalidating accessed data.

17. An information processing apparatus according to claim 16, wherein:

said memory has a structure comprised of a plurality of memory interleaves; and said system controller includes a request queue for individually holding memory requests from said plurality of clusters, a structure comprised of a plurality of system controller interleaves corresponding to said structure comprised of the plurality of memory interleaves, and a request priority circuit for receiving said memory requests and distributing said memory requests to said plurality of system controller interleaves in accordance with an accessed address.

18. An information processing apparatus according to claim 11, wherein:

said circuit generates an invalidation request signal indicating whether or not a data accessed by one of said clusters is invalidated in said level 1 cache in accordance with whether an instruction issued by said cluster is a memory fetch or a memory store, and whether said instruction results in a miss or a hit in said level 2 cache.

19. An information processing apparatus according to claim 11, wherein:

said circuit includes a random access memory (RAM) for setting the result of the miss or the hit.

20. An information processing apparatus according to claim 19, wherein:

said RAM sets said result distributively for each of said processors in said plurality of clusters.

21. An information processing apparatus comprising:

a plurality of processors each having a store-through level 1 cache;

a system controller connected to said processors and having therein a store-in level 2 cache shared by said plurality of processors; and a main memory connected to said system controller, said level 1 cache, said level 2 cache and said main memory being organized as a storage device in a hierarchical structure, wherein said system controller comprises:

a data ownership table including a list of processor numbers having data on each of lines in said level 2 cache; and invalidation request issuing means responsive to a store instruction issued from one of said processors for generating a request for invalidating a level 1 cache directory corresponding to addresses in said processors other than said one processor that has issued the store instruction, based on contents of said data ownership table.

22. An information processing apparatus according to claim 21, wherein:

when data at an address pointed by said store instruction exists in said level 2 cache, said invalidation request issuing means selectively issues an invalidation request for a processor in which data at said address exists.

* * * * *